Patented Apr. 7, 1942

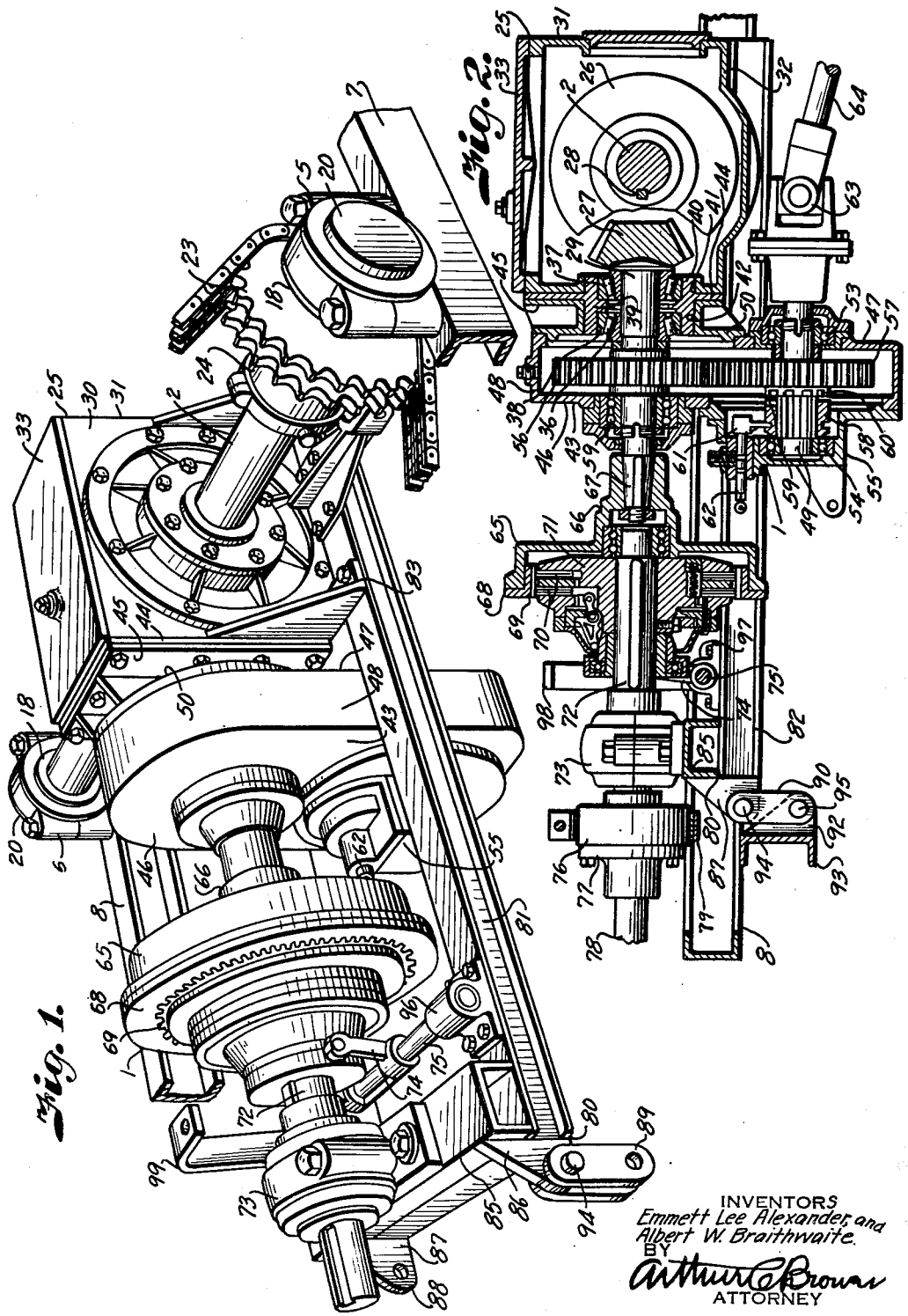

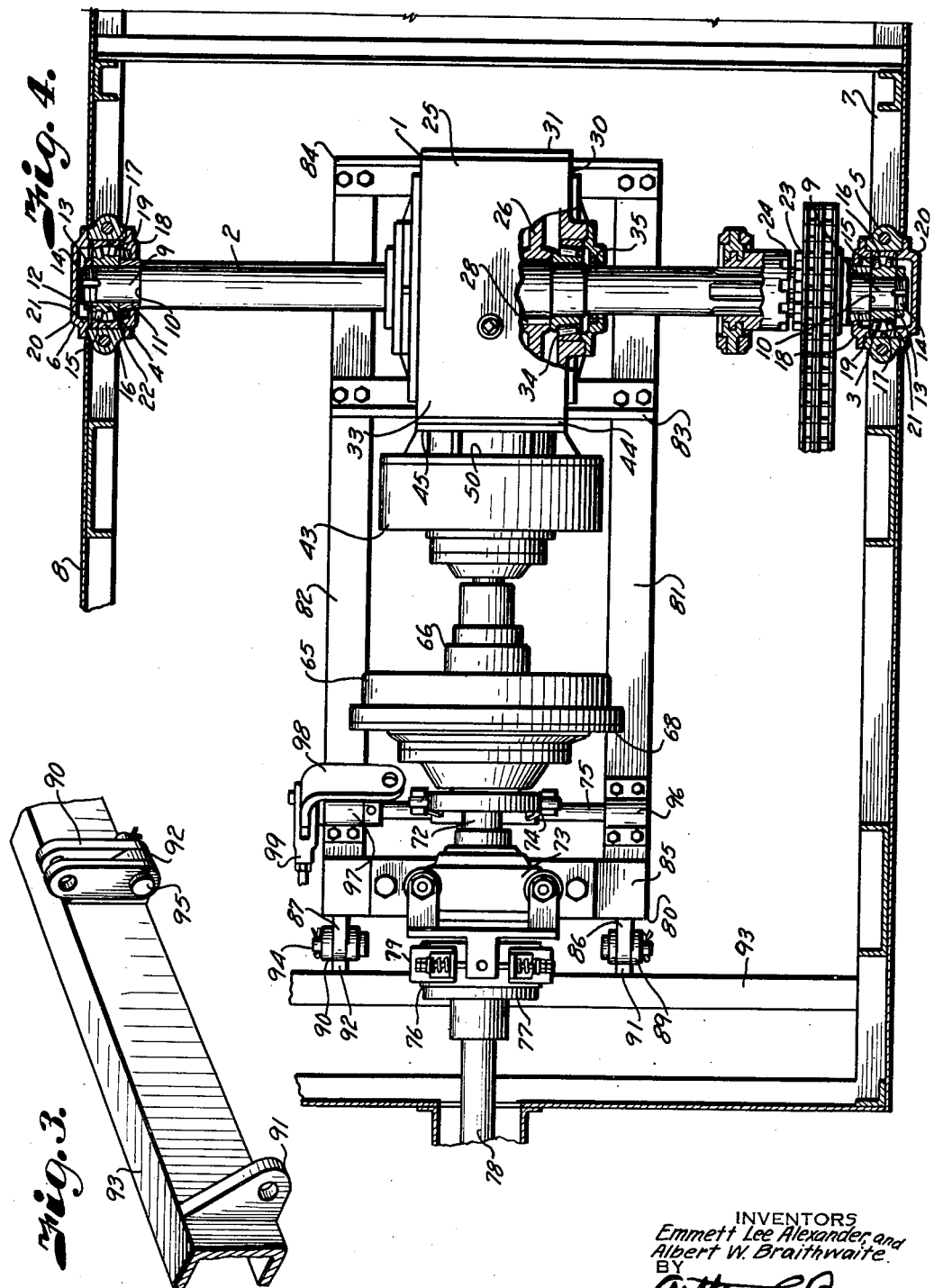

2,278,606

UNITED STATES PATENT OFFICE 2,278,606

TRANSMISSION MOUNTING FOR DRILLING RIGS

Emmett Lee Alexander and Albert W. Braithwaite, Enid, Okla., assignors to The George E. Failing Supply Company, Enid, Okla., a corporation of Oklahoma Application February 28, 1941, Serial No. 381,056

12 Claims. (Cl. 74—16)

This invention relates to a support for the transmission mechanism of a drilling rig, particularly one of portable character wherein the drilling mechanism is mounted on a truck chassis and actuated through power of the truck motor or an auxiliary motor that may be mounted thereon.

The principal object of the invention is to provide a transmission support whereby the driving connections are mounted on a substantially rigid frame that is self-adjustable relatively to a platform frame and which is adapted to pivot about longitudinal and transverse axes for providing freedom of operation of the driving connections.

Other objects of the invention are to provide a compact structure through suspension thereof under the draw-works by pivotally mounting one end of the supporting frame on the main line shaft which actuates the winding drum of the draw-works and providing floating mounting of the opposite end of the frame.

In accomplishing these and other objects of the invention, as hereinafter pointed out, we have provided improved details of structure, the preferred form of which is illustrated in the accompanying drawings, wherein:

Fig. 1 is a perspective view of the inter-connected rotary and line shafts of a drilling rig mounted upon a supporting structure embodying the features of our invention.

Fig. 2 is a longitudinal central section through the unit illustrated in Fig. 1.

Fig. 3 is a detail perspective view of the front cross-rail, particularly illustrating the brackets and floating links which carry the front end of the supporting frame.

Fig 4 is a horizontal section of the platform frame particularly illustrating flexible mounting of the main line shaft.

Referring more in detail to the drawings:

1 designates a power transmission unit of a rotary drilling rig whereby the power of a prime mover, for example the engine of a motor truck on which the drilling rig is mounted, is transmitted to the draw-works and rotary drilling mechanism of the rig. The unit 1 includes a main line shaft 2 which extends transversely of the longitudinal direction of the truck chassis and has its ends mounted in self-aligning bearings 3 and 4 which are carried in pillow blocks 5 and 6 mounted on longitudinal rails 7 and 8 of the drilling rig platform.

The shaft 2 has reduced ends 9 forming shoulders 10. Sleeved on the reduced ends of the shaft are spacing sleeves 11 to space the inner races 12 of the self-adjusting bearings from the shoulders 10 when the inner races are secured on the shaft by nuts 13 turned on threaded terminals 14 of the shaft, as clearly shown in Fig. 3. The inner races of the bearings are thus firmly anchored to the shaft against longitudinal movement. Cooperating with the inner races, to support antifriction rollers 15 therebetween, are outer races 16 having sliding fit within the bores 17 of the pillow blocks. The inner sides of the bearings are closed by seal retainers 18 which encircle the spacers and have annular ribs 19 extending into the bores of the pillow blocks and engaging the inner faces of the outer races. The opposite sides of the bores are closed by retainer plates 20, having similar annular ribs 21 engaging the outer faces of the outer bearing races. The annular ribs of one of the bearing units are arranged to firmly clamp the outer bearing races therebetween, but the ribs of the other bearing, for example, the bearing 4, are slightly spaced, as at 22, for permitting sliding movement of the outer race in the bore of the pillow block. Thus one end of the shaft is supported for fixed pivotal movement in its pivotal block bearing, while the other end of the shaft is mounted for slight longitudinal movement to compensate for torque occurring in the platform frame.

The draw-works (not shown) is supported above the platform frame and is driven by a sprocket 23 having connection with the line shaft 2 through a clutch 24. Suspendedly supported on the line shaft 2 is a gear casing 25 which encloses a bevel gear 26 and a pinion gear 27, the bevelled gear being keyed on the line shaft by a spline 28 and the pinion gear 27 is secured to a stub-shaft 29 journalled in the casing. The casing 25 includes side walls 30 connected by end walls 31, a bottom 32, and a removable cover 33. The casing is of suitable size to enclose the gears. The side walls of the casing carry antifriction bearings 34 which suspend the unit 1 on the line shaft and which are secured by retainer rings 35 similar to the bearings mounting the ends of the line shaft. The shaft 29 is supported in oppositely arranged thrust bearings 36 and 37 which are mounted in recesses 38 of a bearing adapter 39. The bearing adapter includes a collar-like body 40 having one end engaged in an opening 41 of the end wall of the casing and has its opposite end centeringly engaged in an opening 42 of a gear case 43. The adapter 39 has a plate portion 44 which is between the end wall of the gear casing and a bracket 45 which carries the gear case 43.

The gear case 43 includes end walls 46 and 47 interconnected by a marginal wall 48. The gear case extends below the gear casing 25 to mount a driving shaft 49. The bracket 45 includes a plate portion 50 which encloses an opening 51 in the end wall 47. The opposite end wall 46 carries a bearing 52 which journals the outer end of the stub-shaft 29 as shown in Fig. 2. The shaft 49 is journalled in an antifriction bearing 53 carried in the end wall 47 and in a bearing 54 mounted in a lateral extension 55 of the gear case. The shafts 29 and 49 carry intermeshing gears 56 and 57, the gear 56 being fixed to the shaft 29 and the gear 57 being rotatably mounted on the shaft 53 but adapted to be connected in driving relation therewith by means of a shifting clutch collar 58 having teeth 59 adapted to engage teeth 60 on the hub of the gear 57, the clutch collar being slidably splined on the end of the shaft which is journalled in the gear case extension as shown in Fig. 2. The clutch collar is actuated by a shipper 61 carried by a shift rod 62 reciprocably mounted in a suitable support carried by the gear case extension. The driving shaft 49 is connected by a universal joint 63 with a driving shaft 64. The driving shaft 64 is suitably connected with the motor (not shown) of the vehicle on which the drilling rig is mounted and is arranged in the longitudinal center line below the gear casing 25, as shown in Fig. 4. The stub-shaft 29 projects through the gear case and carries a clutch bowl member 65 having a hub 66 which is splined on a tapered end 67 of the stub-shaft. The clutch bowl 65 carries a driving ring 68 having tooth connection with clutch plates 69 cooperating with complementary clutch plates 70 having driving connection with a carrier 71 splined on a shaft 72 which is journalled in a pillow block bearing 73, later described.

The clutch plates are moved into engagement with each other by the usual shifting mechanism actuated by a shipper 74 which is fixed to a rock-shaft 75, later described. The shaft 72 projects through the pillow block 73 and carries a brake drum 76 which is connected by a flange coupling 77 with the rotary operating shaft 78, the drum being controlled by a brake band 79.

The mechanism thus far described is mounted on a substantially rigid frame 80, including side rails 81 and 82 having their rear ends fixed to brackets 83 and 84 extending laterally from the sides of the gear casing 25 previously described, the rails being secured to the brackets by suitable fastening devices as shown in Figs. 1 and 4. The opposite ends of the rails carry a cross-member 85 which is rigidly attached to and mounts the pillow block bearing 73.

Through this arrangement, one end of the frame 80 is suspended from the main line shaft 2 by means of the casing 25, and in order to floatingly support the other end, the cross-member 85 carries brackets 86 and 87 having apertured ears 88. The ears 88 are pivotally connected between pairs of links 89 and 90 with similar ears 91 and 92 projecting from a cross-rail 93 of the platform frame which connects the rails 7 and 8 previously described. The upper ends of the links 89 and 90 are connected with the ears 88 by pins 94 that extend therethrough, and their lower ends are connected with the ears 91 and 92 by pins 95. The forward end of the frame is thus floatingly mounted with respect to the platform frame and is adapted to shift longitudinally with any movement of the line shaft produced through twist or torque of the platform or vehicle frame. The links, being relatively loose, also provide for lateral pivotal movement of the supporting frame to compensate for torsoinal movements of the platform frame. For convenience, the rock-shaft 75 has its ends journalled in bearing brackets 96 and 97 fixed to the rails of the supporting frame. The shaft is rocked by an arm 98 connected with an actuating rod 99.

In operation, power is applied through the shaft 64, universal joint 63, shaft 49, gears 56 and 57, stub-shaft 29, pinion 27, gear 26 and line shaft 2, to the draw-works of the drilling rig. Power is also applied to the rotary through the clutch plates 69 and 70 to the shaft 78, the draw-works and rotary being selectively operative upon engagement of the clutches.

It is obvious that with the transmission mechanism mounted as above described, a very compact arrangement is provided so that it is well adapted for portable drilling rigs. The shafting arrangement, while being relatively short, is provided with sufficient flexible support so as to prevent binding and wear in case of any misalignment of the frames or torsional movement thereof during transportation or drilling operations.

What we claim and desire to secure by Letters Patent is:

1. In a drilling rig, a power transmission unit, a main frame, a line shaft supported on the main frame, a supporting frame for the power transmission unit, means pivotally carrying one end of the last named frame on the line shaft, and means floatably supporting the opposite end of the last named frame on the main frame.

2. In a drilling rig, a power transmission unit, a line shaft, a main frame supporting the line shaft, a supporting frame for the power transmission unit, means pivotally carrying one end of the last named frame on the line shaft, and means floatably supporting the opposite end of the last named frame on the main frame including a link pivotally connecting said frames.

3. In a drilling rig, a power transmission unit, a line shaft, a main frame supporting the line shaft, a supporting frame for the power transmission unit, means pivotally carrying one end of the last named frame on the line shaft, and means floatably supporting the opposite end of the last named frame on the main frame including brackets on the respective frames and links connecting the brackets.

4. In a drilling rig, a line shaft for actuating a draw-works of the drilling rig, a power transmission unit including a gear casing supported by said shaft, an operating shaft for a rotary of the drilling rig, a shaft in the gear casing, means in the gear casing connecting said last named shaft with the line shaft, a clutch connecting the rotary operating shaft with said last named shaft, a supporting frame having one end fixed to the gear casing, a pillow bearing fixed to the frame and journalling the rotary operating shaft, and means movably carrying the other end of the supporting frame to compensate for torsional movement of the line shaft.

5. In a drilling rig, a line shaft for actuating a draw-works of the drilling rig, a power transmission unit including a gear casing supported by said shaft, an operating shaft for a rotary of the drilling rig, a supporting frame having one end fixed to the gear casing, a pillow block bearing fixed to the opposite end of the frame and journalling the rotary operating shaft, and links supporting the end of the frame carrying the pillow block bearing.

6. In a drilling rig, a line shaft for actuating a draw-works of the drilling rig, a power transmission unit including a gear casing supported by said shaft, an operating shaft for a rotary of the drilling rig, a shaft in the gear casing, means in the gear casing connecting said last named shaft with the line shaft, a clutch connecting the rotary operating shaft with said last named shaft, a supporting frame having one end fixed to the gear casing, a pillow block bearing fixed to the frame and journalling the rotary operating shaft, and links supporting the other end of the frame.

7. In a drilling rig, a line shaft for actuating a draw-works of the drilling rig, a power transmission unit including a gear casing supported by said shaft, an operating shaft for a rotary of the drilling rig, a shaft in the gear casing, means in the gear casing connecting said last named shaft with the line shaft, a clutch connecting the rotary operating shaft with said last named shaft, a supporting frame having one end fixed to the gear casing, a pillow bearing block fixed to the frame for journalling the rotary operating shaft, a flexible support for the other end of the frame, a gear case connected with the gear casing, intermeshing gears in the gear case, means fixing one of the gears to said shaft in the gear casing, and a driving shaft mounting the other gear in said gear casing.

8. In a drilling rig, a power transmission unit including a line shaft for actuating a draw-works of the drilling rig, a second line shaft arranged transversely of the first line shaft, a gear casing supported on the first named line shaft, means connecting said line shafts including gears in the gear casing, a supporting frame fixed to the gear casing, a pillow block bearing rotatably supporting the second line shaft on said frame, and means suspendingly supporting the frame at a point adjacent said pillow block bearing.

9. In a drilling rig, a power transmission unit including a line shaft for actuating a draw-works of the drilling rig, a second line shaft arranged transversely of the first line shaft, a gear casing supported on the first named line shaft, gears connecting said shafts, a supporting frame fixed to the gear casing and having interconnected rails extending in substantially parallel relation with the second line shaft, a pillow block bearing rotatably supporting the second line shaft on said frame, and means suspendingly supporting the frame at a point adjacent said pillow block bearing.

10. In a drilling rig, a power transmission unit including a line shaft for actuating a draw-works of the drilling rig, a second line shaft arranged transversely of the first line shaft, a gear casing supported on the first named line shaft, means connecting said shafts including gears in the gear casing, a supporting frame fixed to the gear casing and having interconnected rails extending in substantially parallel relation with the second line shaft, a pillow block bearing rotatably supporting the second line shaft on said frame, means suspendingly supporting the frame at a point adjacent said pillow block bearing, and a clutch in said connecting means.

11. In a drilling rig, a power transmission unit, a line shaft, a main frame supporting the line shaft, a supporting frame for the power transmission unit, means pivotally carrying one end of the last named frame on the line shaft, and means movably supporting the opposite end of the last named frame from the main frame.

12. In a drilling rig, a power transmission unit, a main frame, a line shaft, self-aligning bearings supporting the line shaft on the main frame, a supporting frame for the power transmission unit, means pivotally carrying one end of the last named frame on the line shaft, and means floatably supporting the opposite end of the last named frame on the main frame.

EMMETT LEE ALEXANDER.
ALBERT W. BRAITHWAITE.